United States Patent
Yamagishi et al.

(10) Patent No.: US 8,216,016 B2
(45) Date of Patent: Jul. 10, 2012

(54) METHOD OF MANUFACTURING DISPLAY PANEL

(75) Inventors: Shinji Yamagishi, Osaka (JP); Mitsuaki Morimoto, Osaka (JP); Mitsuhiko Sahara, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 36 days.

(21) Appl. No.: 13/001,521

(22) PCT Filed: May 25, 2009

(86) PCT No.: PCT/JP2009/002282
§ 371 (c)(1),
(2), (4) Date: Dec. 27, 2010

(87) PCT Pub. No.: WO2010/029660
PCT Pub. Date: Mar. 18, 2010

(65) Prior Publication Data
US 2011/0104975 A1    May 5, 2011

(30) Foreign Application Priority Data
Sep. 12, 2008  (JP) ................. 2008-234525

(51) Int. Cl.
*H01J 9/24* (2006.01)
(52) U.S. Cl. .......................... 445/24; 445/25
(58) Field of Classification Search ........... 445/24–25; 313/498–512; 349/187–192
See application file for complete search history.

(56) References Cited

U.S. PATENT DOCUMENTS
2010/0225874 A1 * 9/2010 Nomura et al. ............... 349/155

FOREIGN PATENT DOCUMENTS
| JP | 10-104561 | 4/1998 |
| JP | 2000-016826 | 1/2000 |
| JP | 2008-026416 | 2/2008 |

OTHER PUBLICATIONS
International Search Report for PCT/JP2009/002282, mailed Jul. 28, 2009.

* cited by examiner

*Primary Examiner* — Anne Hines
(74) *Attorney, Agent, or Firm* — Nixon & Vanderhye, P.C.

(57) ABSTRACT

A cutting step of forming a crack (C) above at least one side of a sealant (15) surrounding each display region (D) in each of outer surfaces of a first mother substrate (20) and a second mother substrate (10) of a bonded body (30), and cutting the bonded body (30) into sections including the display regions (D) includes: a first mother substrate cutting step of forming a crack (C) above the sealant (15) surrounding each display region (D) in the outer surface of the first mother substrate (20), and then causing the crack (C) to develop in a substrate thickness direction to cut the first mother substrate (20) into sections including the display regions (D); a residual stress reducing step of reducing a residual stress of the sealant (15) in the bonded body (30) in which the first mother substrate (20) has been cut; and a second mother substrate cutting step of forming a crack (C) above the sealant (15) surrounding each display region (D) in the outer surface of the second mother substrate (10) of the bonded body (30) in which the residual stress of the sealant (15) has been reduced, and then causing the crack (C) to develop in the substrate thickness direction to cut the second mother substrate (10) into sections including the display regions (D).

9 Claims, 6 Drawing Sheets

METHOD OF MANUFACTURING DISPLAY PANEL

This application is the U.S. national phase of International Application No. PCT/JP2009/002282, filed 25 May 2009, which designated the U.S. and claims priority to Japanese Patent Application No. 2008-234525, filed 12 Sep. 2008, the entire contents of each of which are hereby incorporated by reference.

TECHNICAL FIELD

The present invention relates to methods of manufacturing a display panel, and more particularly to a technique of breaking (cutting), on a sealant, a pair of glass substrates that fowl a display panel.

BACKGROUND ART

Liquid crystal display (LCD) panels include, e.g., a thin film transistor (TFT) substrate, a color filter (CF) substrate positioned so as to face the TFT substrate, a liquid crystal layer provided between the TFT substrate and the CF substrate, and a sealant provided in a frame shape to bond the TFT substrate to the CF substrate and to enclose the liquid crystal layer between the TFT substrate and the CF substrate, and a display region for displaying an image is defined inside the sealant.

Recently, in LCD panels for mobile devices such as mobile phones, mobile information terminals, and mobile game machines, there is a growing demand to reduce the width of a frame region that is defined around the display region. Thus, in a proposed manufacturing technology of such LCD panels for mobile devices, a pair of glass substrates that form an LCD panel are broken on a sealant to reduce the width that is occupied by the sealant, thereby reducing the frame width.

For example, Patent Document 1 discloses a method of manufacturing an LCD element, which includes the steps of: applying a sealant to at least one of a pair of glass substrates; superposing the pair of glass substrates together, and curing the sealant to bond the pair of glass substrates together with a gap therebetween; scribing a surface of the pair of glass substrates substantially along the center line of the cured sealant, and then heating the pair of glass substrates in an oven; and hitting or pressing the scribed surface of the pair of glass substrates to break the glass substrates so that the sealant is located so as to be exposed at the glass edges. Patent Document 1 describes that this manufacturing method can reduce the dead space around the sealant.

CITATION LIST

Patent Document

PATENT DOCUMENT 1: Japanese Patent Publication No. 2008-26416

SUMMARY OF THE INVENTION

Technical Problem

FIG. 10 is a cross-sectional view showing a process of breaking a CF mother substrate 120 of a bonded body 130 for simultaneously manufacturing a plurality of LCD panels in a conventional example. FIG. 11 is a cross-sectional view showing a process of breaking a TFT mother substrate 110 of the bonded body 130.

As shown in FIGS. 10-11, the bonded body 130 includes: the TFT mother substrate 110 which is made of glass, and in which a plurality of display regions are formed; the CF mother substrate 120 which is made of glass, and in which a plurality of display regions are similarly formed; and a plurality of frame-shaped sealants 115 for bonding the TFT mother substrate 110 to the CF mother substrate 120 in each display region, and enclosing a liquid crystal layer 125, which is provided in each display region, between the TFT mother substrate 110 and the CF mother substrate 120.

When breaking the bonded body 130 into sections including the display regions, as shown in FIG. 10, a hard metal wheel (a cutting blade) H is first rolled in a direction in which the sealant 115 extends, with the blade tip of the hard metal wheel H being in contact with, e.g., the surface of the CF mother substrate 120 on the sealant 115. Thus, a linear crack C is formed, and is caused to develop (propagate) in the substrate thickness direction, thereby breaking the CF mother substrate 120 into sections including the display regions.

Then, as shown in FIG. 11, the bonded body 130, in which the CF mother substrate 120 has been broken, is reversed, and the hard metal wheel H is rolled in the direction in which the sealant 115 extends, with the blade tip of the hard metal wheel H being in contact with the surface of the TFT mother substrate 110 on the sealant 115. Thus, a linear crack C is formed, and is caused to develop in the substrate thickness direction.

However, such a breaking method can break the CF mother substrate 120 of the bonded body 130, which is to be broken first, but may not be able to break the TFT mother substrate 110 that is to be broken later.

The reason for this will be described specifically below. As shown in FIG. 11, a compressive residual stress Sa is generated in the inner surface of the TFT mother substrate 110 by the sealant 115 interposed between the TFT mother substrate 110 and the CF mother substrate 120. Moreover, after breaking the CF mother substrate 120 that is to be broken first, the CF mother substrate 120 and the TFT mother substrate 110 can be slightly bent due to displacement between adjoining ones of the resultant faces (the broken faces) of the CF mother substrate 120, which is caused by irregularities in the resultant faces of the CF mother substrate 120, foreign matter introduced therebetween, etc. Thus, a compressive stress Sb is generated in the outer surface of the TFT mother substrate 110. The crack C, which is formed at the surface of the TFT mother substrate 110 that is broken later, may not develop in the substrate thickness direction due to the compressive residual stress Sa and the compressive stress Sb. The breaking property of the substrate that is broken later is affected more by the compressive residual stress Sa than by the compressive stress Sb.

The present invention was developed in view of the above problems, and it is an object of the present invention to cut, on a sealant, both of a pair of glass substrates that form a display panel.

Solution to the Problem

In order to achieve the above object, according to the present invention, a second mother substrate of a bonded body is cut after reducing a residual stress of a sealant in the bonded body in which a first mother substrate has been cut.

Specifically, a method of manufacturing a display panel according to the present invention includes: a bonded body fabricating step of fabricating a bonded body having a first mother substrate, which is made of glass and in which a plurality of display regions are formed, a second mother substrate, which is made of glass and is positioned so as to face the first mother substrate, and in which a plurality of display regions are formed so as to overlap the display regions of the first mother substrate, and a sealant, which is provided in a frame shape between the first mother substrate and the second mother substrate so as to surround each of the display regions, and which bonds the first mother substrate to the second mother substrate; and a cutting step of forming a crack above at least one side of the sealant surrounding each of the display regions in each of outer surfaces of the first mother substrate and the second mother substrate of the bonded body, and cutting the bonded body into sections including the display regions. The cutting step includes a first mother substrate cutting step of forming a crack above at least one side of the sealant surrounding each of the display regions in the outer surface of the first mother substrate of the bonded body, and then causing the crack to develop in a substrate thickness direction to cut the first mother substrate into sections including the display regions, a residual stress reducing step of reducing a residual stress of the sealant in the bonded body in which the first mother substrate has been cut, and a second mother substrate cutting step of forming a crack above at least one side of the sealant surrounding each of the display regions in the outer surface of the second mother substrate of the bonded body in which the residual stress of the sealant has been reduced, and then causing the crack to develop in the substrate thickness direction to cut the second mother substrate into sections including the display regions.

According to the above method, the residual stress reducing step of reducing the residual stress of the sealant in the bonded body is included between the first mother substrate cutting step of cutting the first mother substrate of the bonded body which is to be cut first, and the second mother substrate cutting step of cutting the second mother substrate of the bonded body which is to be cut later. This reduces the compressive residual stress that is caused by the sealant in the inner surface of the second mother substrate of the bonded body in which the first mother substrate has been cut. Thus, in the second mother substrate cutting step, the crack can be caused to develop in the substrate thickness direction after being formed above at least one side of the sealant surrounding each display region in the outer surface of the second mother substrate of the bonded body. Accordingly, the second mother substrate can be cut into the sections including the display regions. Since both the first mother substrate that is to be cut first in the bonded body, and the second mother substrate that is to be cut later are cut in this manner, both of the pair of glass substrates that form a display panel can be cut on the sealant.

In the residual stress reducing step, the bonded body in which the first mother substrate has been cut may be heated to a glass transition point of the sealant.

According to the above method, the bonded body in which the first mother substrate has been cut is heated to the glass transition point of the sealant in the residual stress reducing step. This specifically reduces the compressive residual stress that is caused by the sealant in the inner surface of the second mother substrate of the bonded body in which the first mother substrate has been cut.

The first mother substrate and the second mother substrate may have the same thickness.

According to the above method, since the first mother substrate and the second mother substrate have the same thickness, it is difficult to bend the bonded body so that the first mother substrate faces inward, after forming the crack in the outer surface of the second mother substrate that is to be cut later in the bonded body. Accordingly, it is difficult to cause the crack on the second mother substrate to develop in the substrate thickness direction. However, the residual stress of the sealant in the bonded body is reduced in the residual stress reducing step, and this reduces the compressive residual stress that is caused by the sealant in the inner surface of the second mother substrate of the bonded body. Thus, the crack on the second mother substrate can be caused to develop in the substrate thickness direction.

In the second mother substrate cutting step, the crack may be formed after cooling the bonded body heated in the residual stress reducing step.

According to the above method, the heated bonded body is cooled before forming the clack in the outer surface of the second mother substrate of the bonded body. This facilitates the process of causing the crack to develop in the substrate thickness direction after forming thr crank in the outer surface of the second mother substrate of the bonded body.

In the bonded body fabricating step, a liquid crystal layer may be enclosed in an area located inside the sealant surrounding each of the display regions.

According to the above method, in the bonded body fabricated in the bonded body fabricating step, the liquid crystal layer is enclosed by the sealant surrounding each of the display regions. Thus, a method of manufacturing an LCD panel by using a one drop fill (ODF) method is specifically configured.

In the bonded body fabricating step, the sealant may be provided so as to be shared by adjoining ones of the display regions.

According to the above method, since the sealant is shared by adjoining ones of the display regions of the bonded body, the dead space in the bonded body is reduced, and the number of display panels that can be manufactured from the bonded body can be increased.

In the residual stress reducing step, the bonded body in which the first mother substrate has been cut may be heated in an oven.

According to the above method, since the bonded body is heated in the oven, the bonded body can be reliably heated to the glass transition point of the sealant.

In the cutting step, the bonded body may be cut by using a disc-shaped cutting blade.

According to the above method, since the bonded body is cut by using the disc-shaped cutting blade in the cutting step, the bonded body is specifically cut by rolling the cutting blade along the substrate surface while placing the outer periphery of the cutting blade on the outer surfaces of the first mother substrate and the second mother substrate on the sealant.

In the residual stress reducing step, the bonded body in which the first mother substrate has been cut may be left until the residual stress of the sealant is reduced.

According to the above method, in the residual stress reducing step, the bonded body in which the first mother substrate has been cut is left until the residual stress of the sealant is reduced. This specifically reduces the compressive residual stress that is caused by the sealant in the inner surface of the second mother substrate of the bonded body in which the first mother substrate has been cut.

Advantages of the Invention

According to the present invention, the second mother substrate of the bonded body is cut after reducing the residual stress of the sealant in the bonded body in which the first mother substrate has been cut. Thus, both of the pair of glass substrates that form a display panel can be cut on the sealant.

DESCRIPTION OF EMBODIMENTS

An embodiment of the present invention will be described in detail below with reference to the accompanying drawings. Note that the present invention is not limited to the following embodiment.

Figure 1:
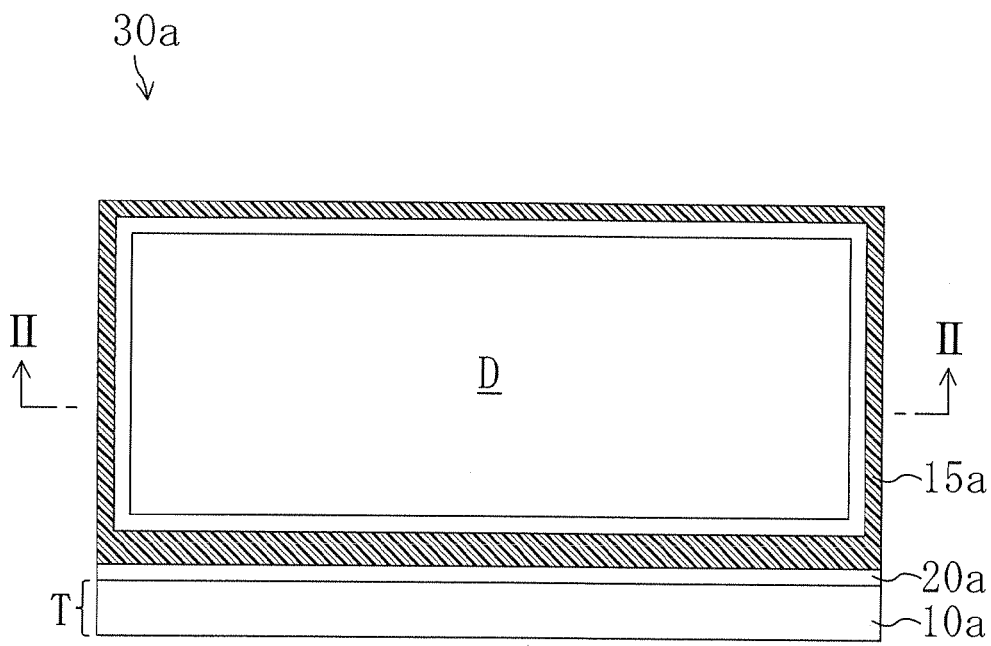
FIG. 1 is a plan view of an LCD panel 30a according to an embodiment of the present invention.
Figure 2:
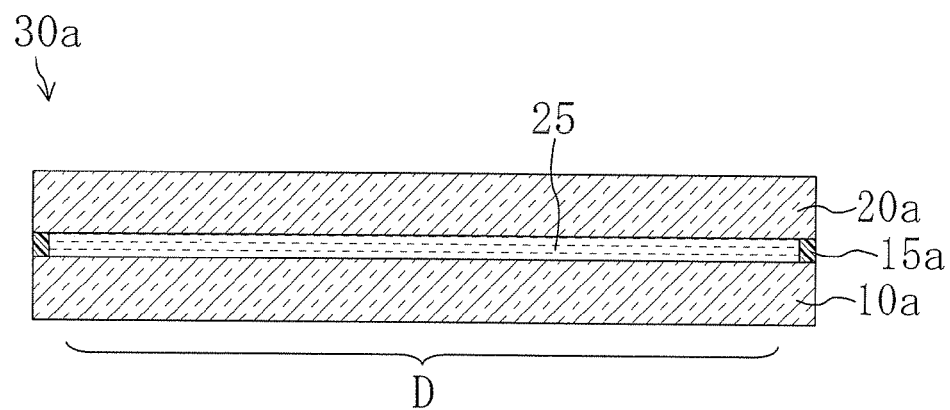
FIG. 2 is a cross-sectional view of the LCD panel 30a taken along line II-II in FIG. 1.

FIG. 1 is a plan view of an LCD panel 30a of the present embodiment, and FIG. 2 is a cross-sectional view of the LCD panel 30a taken along line II-II in FIG. 1.

As shown in FIGS. 1-2, the LCD panel 30a includes: a TFT substrate 10a and a CF substrate 20a, which are positioned so as to face each other; a liquid crystal layer 25 provided between the TFT substrate 10a and the CF substrate 20a; and a sealant (a sealing material) 15a provided in a frame shape to bond the TFT substrate 10a to the CF substrate 20a, and to enclose the liquid crystal layer 25 therebetween.

The TFT substrate 10a includes: a plurality of gate lines (not shown) provided so as to extend parallel to each other on a glass substrate; a gate insulating film (not shown) provided so as to cover the gate lines; a plurality of source lines (not shown) provided on the gate insulating film so as to extend parallel to each other in a direction perpendicular to the gate lines; a plurality of TFTs (not shown) provided at each intersection of the gate lines and the source lines; an interlayer insulating film provided so as to cover the source lines and the TFTs; and a plurality of pixel electrodes (not shown) provided in a matrix pattern on the interlayer insulating film, and connected to the TFTs. In the TFT substrate 10a, the pixel electrodes are arranged in the matrix pattern to form a display region D. As shown in FIG. 1, the lower side portion of the TFT substrate 10a protrudes beyond the CF substrate 20a to form a terminal region T, and a plurality of input terminals that are connected to display interconnects such as the gate lines and the source lines, etc. are provided in the terminal region T.

The CF substrate 20a includes: a black matrix (not shown) provided in a frame shape on a glass substrate and in a grid pattern in the frame; a color filter (not shown) including red, green, and blue layers provided between the grid lines of the black matrix; and a common electrode (not shown) provided so as to cover the black matrix and the color filter. Note that in the CF substrate 20a, the red, green, and blue layers of the color filter are arranged in a matrix pattern to form a display region D.

The thickness of the TFT substrate 10a is substantially the same as that of the CF substrate 20a. The "substrates have substantially the same thickness" means that the thickness of one substrate is in the range from 0.9 to 1.1 times that of the other substrate.

The liquid crystal layer 25 is made of a liquid crystal material containing nematic liquid crystal having electro-optical characteristics.

As shown in FIG. 1, the sealant 15a is formed so that the portions extending along the upper, left, and right sides of the CF substrate 20a are relatively narrow (e.g., 0.6 mm), and the portion extending along the lower side of the CF substrate 20a is relatively wide (e.g., 1.2 mm). As shown in FIG. 1, those portions of the outer end faces of the sealant 15a which extend along the upper, left, and right sides of the CF substrate 20a, match the end faces (the upper, left, and right sides) of both the TFT substrate 10a and the CF substrate 20a.

In the LCD panel 30a having the above structure, one pixel is formed in every pixel electrode. By applying a voltage of a predetermined magnitude to the liquid crystal layer 25 in each pixel, the alignment state of the liquid crystal layer 25 is changed to adjust the transmittance of light that is incident from, e.g., a backlight, whereby an image is displayed.

Figure 3:
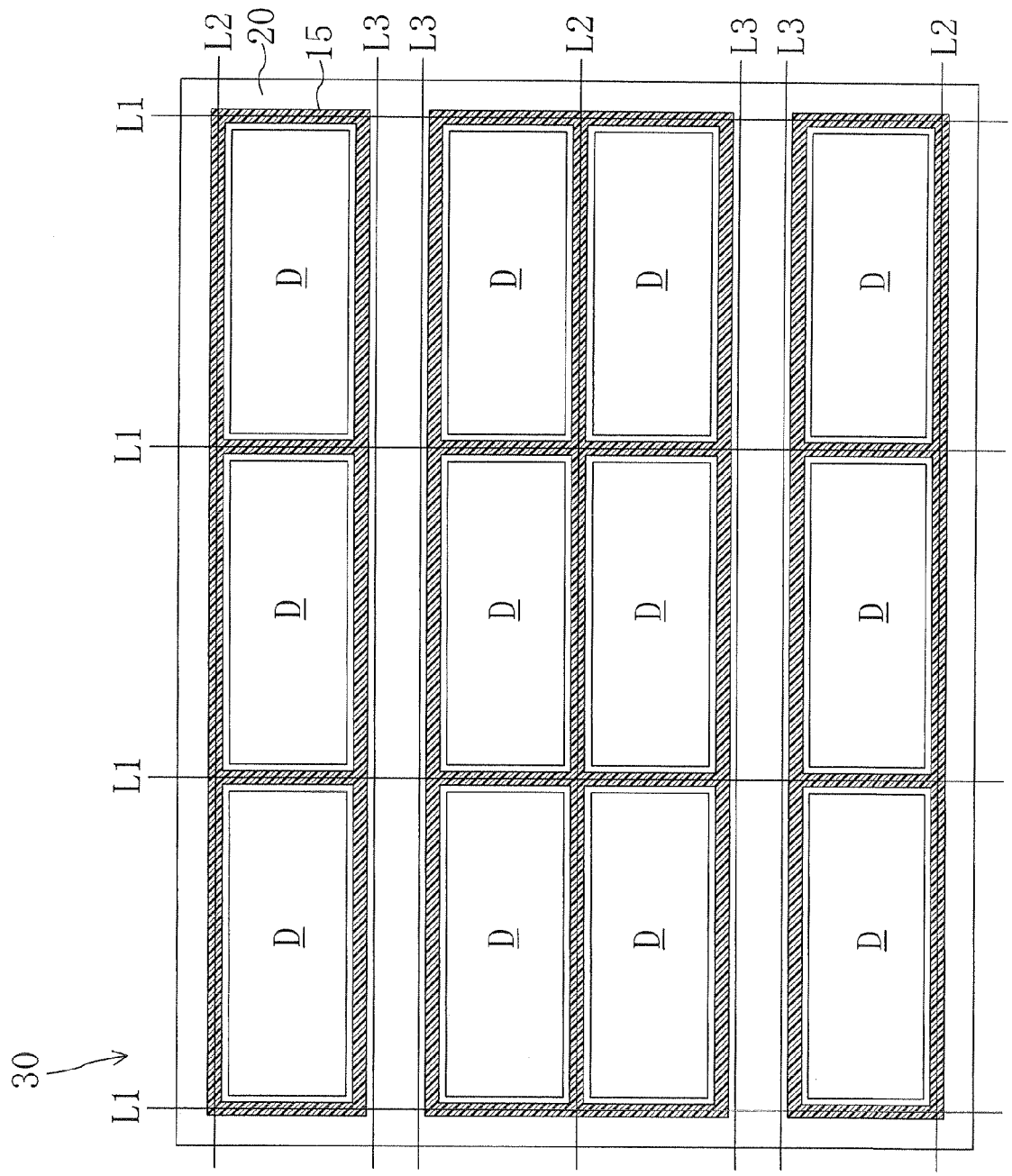
FIG. 3 is a plan view of a bonded body 30 for manufacturing a plurality of LCD panels 30a, as viewed from a CF mother substrate 20.
Figure 4:
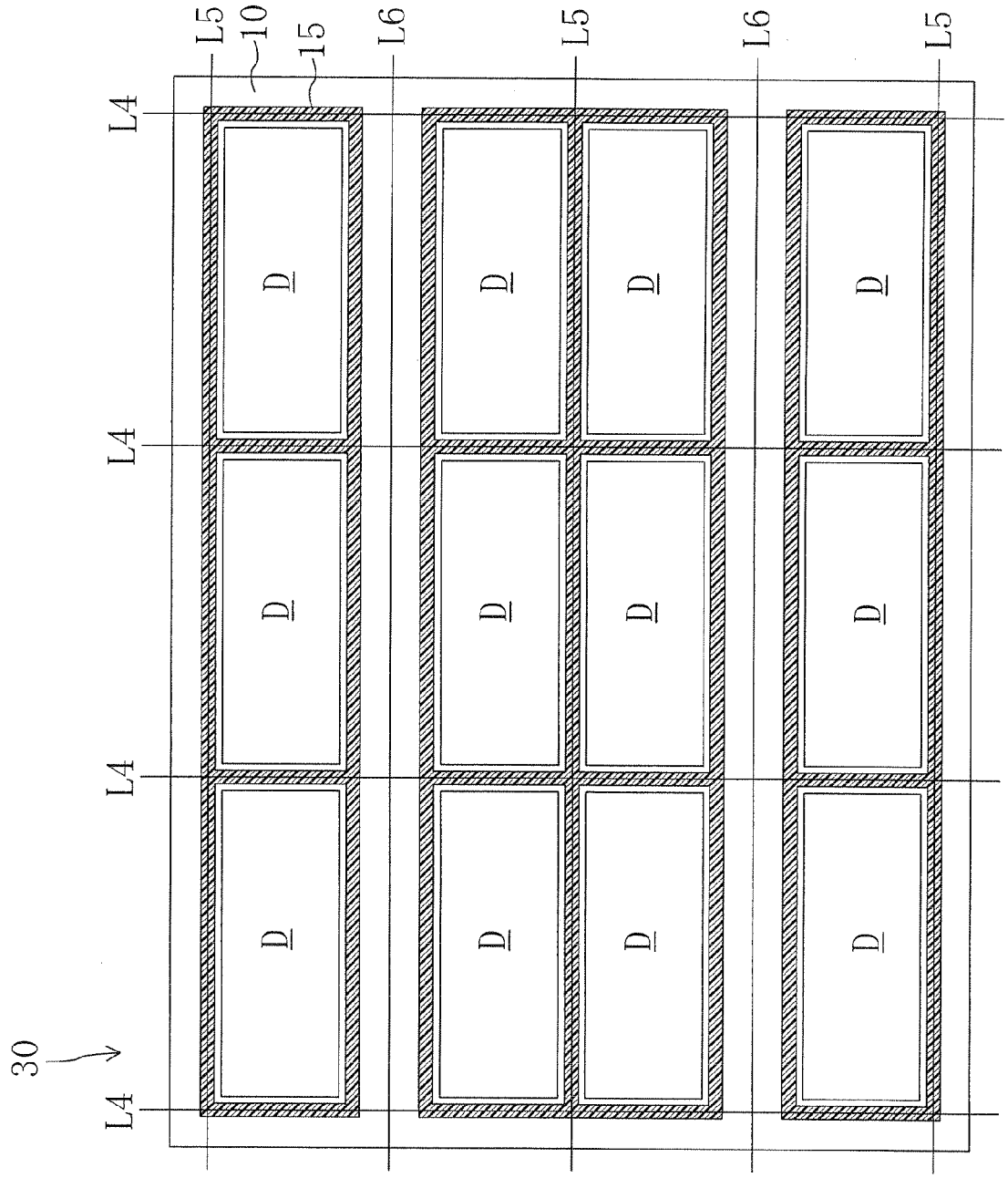
FIG. 4 is a plan view of the bonded body 30 for manufacturing a plurality of LCD panels 30a, as viewed from a TFT mother substrate 10.
Figure 5:
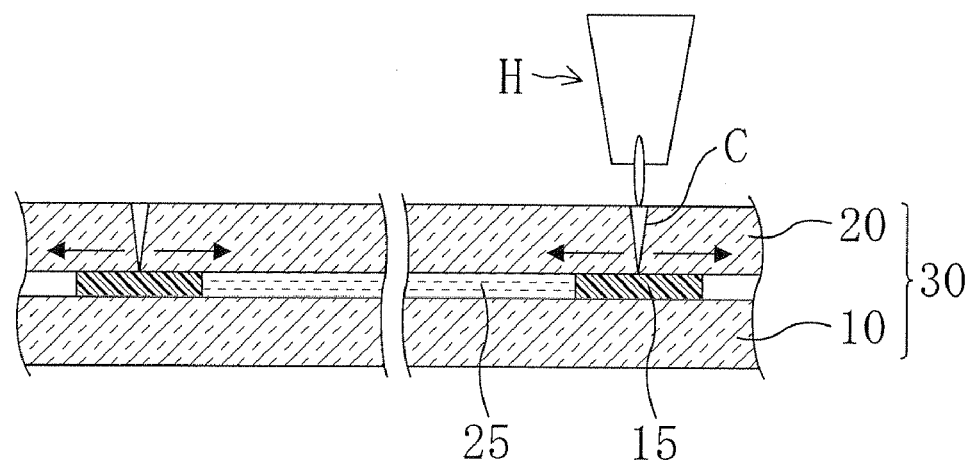
FIG. 5 is a cross-sectional view of the bonded body 30 in a CF mother substrate breaking step.
Figure 6:
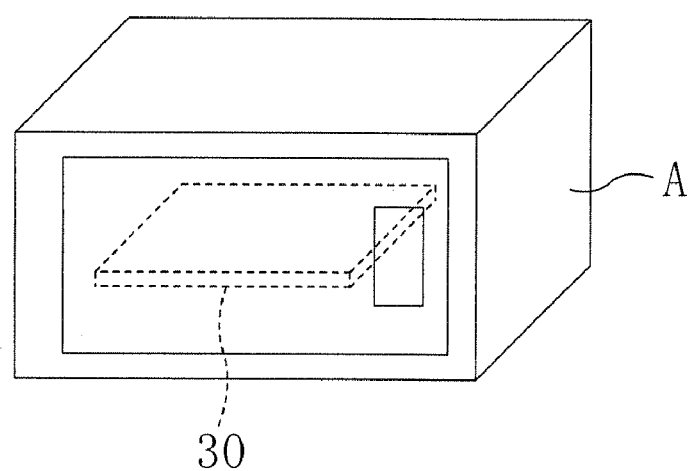
FIG. 6 is a perspective view of an oven A that is used in a residual stress reducing step.
Figure 7:
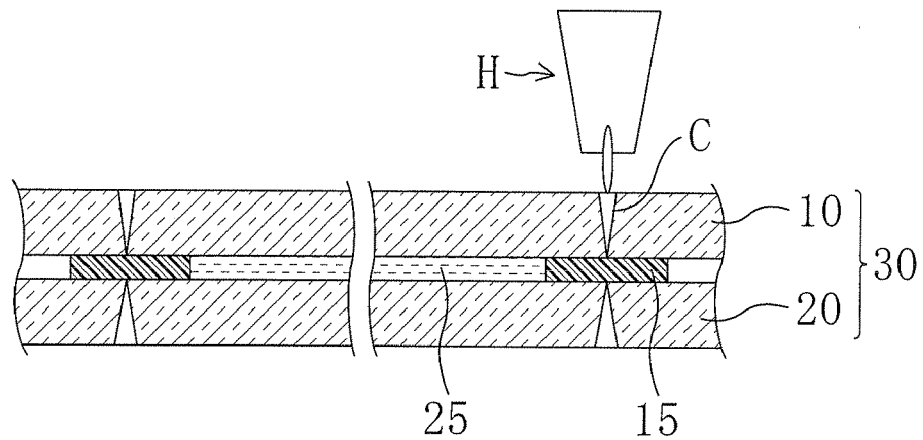
FIG. 7 is a cross-sectional view of the bonded body 30 in a TFT mother substrate breaking step.

A method of manufacturing the LCD panel 30a having the above structure will be described below with reference to FIGS. 3-7. FIG. 3 is a plan view of a bonded body 30 for manufacturing a plurality of LCD panels 30a, as viewed from the CF mother substrate 20. FIG. 4 is a plan view of the bonded body 30 as viewed from the TFT mother substrate 10. FIG. 5 is a cross-sectional view of the bonded body 30 in a CF mother substrate breaking (cutting) step that will be described later. FIG. 6 is a perspective view of an oven A that is used in a residual stress reducing step that will be described later. FIG. 7 is a cross-sectional view of the bonded body 30 in a TFT mother substrate breaking (cutting) step that will be described later. Note that the manufacturing method of the present embodiment includes a bonded body fabricating step, and a breaking (cutting) step including the CF mother substrate breaking (cutting) step, the residual stress reducing step, and the TFT mother substrate breaking (cutting) step.

[Bonded Body Fabricating Step]

First, TFTs, pixel electrodes, etc. are patterned on, e.g., a glass substrate having a thickness of 0.4 mm, thereby forming a plurality of active element layers, each functioning as a display region D. Then, an alignment film is formed over the substrate surface, whereby a TFT mother substrate (a second mother substrate) 10 having the plurality of display regions D formed in a matrix pattern is fabricated (see the TFT mother substrate 10 in FIG. 4).

Moreover, a color filter, a common electrode, etc. are patterned on, e.g., a glass substrate having a thickness of 0.4 mm, thereby forming a plurality of CF element layers, each functioning as a display region D. Then, an alignment film is formed over the substrate surface, whereby a CF mother substrate (a first mother substrate) 20 having the plurality of display regions D formed in a matrix pattern is fabricated (see the CF mother substrate 20 in FIG. 3).

Then, for example, an ultraviolet (UV) curable, thermosetting acrylic/epoxy resin is applied (written or painted) around each display region D of the CF mother substrate 20 by a seal dispenser to form a sealant 15 (see FIGS. 3-4). In the present embodiment, as shown in FIGS. 3-4, the acrylic/epoxy resin is applied so that the sealant 15 is shared by adjoining ones of the display regions D.

Thereafter, a liquid crystal material is dropped onto, e.g., an area inside each display region D of the TFT mother substrate 10.

Subsequently, in a vacuum atmosphere, the TFT mother substrate 10 having the liquid crystal material dropped thereon is bonded to the CF mother substrate 20 having the sealant 15 formed thereon, so that the display regions D of the TFT mother substrate 10 overlap the display regions D of the CF mother substrate 20. Then, the atmosphere is restored to the atmospheric pressure to press the outer surfaces of the TFT mother substrate 10 and the CF mother substrate 20. Then, the sealant 15 is cured by UV radiation and thermal baking (e.g., at 180° C.), whereby a bonded body 30 having the liquid crystal layer 25 enclosed in each display region D is fabricated.

[CF Mother Substrate Breaking Step]

In the bonded body 30 fabricated in the bonded body fabricating step, a crack C is formed at the surface of the CF mother substrate 20 by rolling a hard metal wheel H along cutting lines L1, L2, and L3. As shown in FIG. 5, in the cutting lines L1, L2 shown in FIG. 3, the hard metal wheel H is rolled with its blade tip being in contact with the outer surface of the CF mother substrate 20 of the bonded body 30 at a position located in the middle of the sealant 15 in the width direction thereof. In the cutting line L3 shown in FIG. 3, the hard metal wheel H is rolled with its blade tip being in contact with the outer surface of the CF mother substrate 20 at a position located outside the sealant 15. Then, the crack C is caused to develop in the substrate thickness direction to break the CF mother substrate 20 of the bonded body 30.

The hard metal wheel H is a disc-shaped cutting blade made of, e.g., a super-hard alloy such as tungsten carbide, and is formed so that the side surfaces of the disc protrude toward the center in the thickness direction in a tapered manner. A protrusion may be formed on the tapered blade tip of the hard metal wheel H.

[Residual Stress Reducing Step]

As shown in FIG. 6, the bonded body 30, in which the CF mother substrate 20 has been broken in the CF mother substrate breaking step, is placed in a hot air circulating oven A heated to, e.g., 130° C., and is heated to the glass transition point of the sealant 15.

[TFT Mother Substrate Breaking Step]

After the bonded body 30 heated in the residual stress reducing step is cooled to about room temperature, a crack C is formed at the surface of the TFT mother substrate 10 of the bonded body 30 by rolling the hard metal wheel H along cutting lines L4, L5, and L6. As shown in FIG. 7, in the cutting lines L4, L5 shown in FIG. 4, the hard metal wheel H is rolled with its blade tip being in contact with the outer surface of the TFT mother substrate 10 of the bonded body 30 at a position located in the middle of the sealant 15 in the width direction thereof. In the cutting line L6 shown in FIG. 4, the hard metal wheel H is rolled with its blade tip being in contact with the outer surface of the TFT mother substrate 10 at a position located outside the sealant 15. Then, the crack C is caused to develop in the substrate thickness direction to break the TFT mother substrate 10 of the bonded body 30.

Then, the bonded body 30, in which the TFT mother substrate 10 and the CF mother substrate 20 have been broken, is bent so that the TFT mother substrate 10 or the CF mother substrate 20 faces inward, thereby breaking the sealant 15 into sealants 15a, and thus breaking the bonded body 30 into sections including the display regions D.

The LCD panel 30a can be manufactured in this manner.

Specific experiments conducted will be described below.

As an example of the present embodiment, bonded bodies 30 were fabricated by the same method as that of the above embodiment, and LCD panels were manufactured by performing a process of breaking the bonded bodies under the breaking conditions (and the heating conditions) shown in Table 1 below. In this example, the TFT mother substrate 10 and the CF mother substrate 20 have a thickness of 0.4 mm, and the glass transition point of the sealant 15 is 130° C.

TABLE 1

| Experiment No. | Order of Breaking | Heating Conditions | Breaking Property of Panel | Appearance | Outer Dimensions |
|---|---|---|---|---|---|
| 1 | CF ⇒ TFT | — | X | — | — |
| 2 | CF ⇒ Heat ⇒ TFT | 130° C., 20 Min | Δ | X | X |
| 3 | CF ⇒ Heat ⇒ TFT | 130° C., 30 Min | ○ | ○ | ○ |
| 4 | CF ⇒ Heat ⇒ TFT | 130° C., 60 Min | ○ | ○ | ○ |
| 5 | CF ⇒ TFT ⇒ Heat | 130° C., 60 Min | X | — | — |
| 6 | CF ⇒ Leave ⇒ TFT | Room Temperature, 60 Min | X | — | — |

Specifically, in Experiment 1 in Table 1, the TFT mother substrate 10 is broken immediately after breaking the CF mother substrate 20.

In Experiments 2, 3, and 4, the CF mother substrate 20 is broken first, and the bonded body 30 is heated at 130° C. for 20, 30, and 60 minutes, respectively. Then, the TFT mother substrate 10 is broken after cooling the bonded body 30 to room temperature.

In Experiment 5, the CF mother substrate 20 and the TFT mother substrate 10 are sequentially broken in this order, and then the bonded body 30 is heated at 130° C. for 60 minutes. Experiment 5 corresponds to the invention described in Patent Document 1.

In Experiment 6, the CF mother substrate 20 is broken first. Then, the TFT mother substrate 10 is broken after leaving the bonded body 30 at room temperature for 60 minutes.

Figure 8:
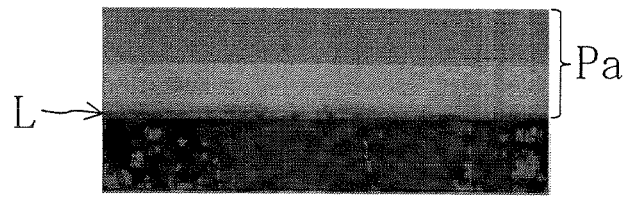
FIG. 8 is an enlarged image of an end of an LCD panel Pa.

The result is shown in the right columns in Table 1. In Experiments 3 and 4 in which the bonded body 30 was heated at 130° C. for 30 and 60 minutes, respectively, after breaking the CF mother substrate 20, the crack C formed on the TFT mother substrate 10 developed in the substrate thickness direction, and the bonded body 30 was able to be satisfactorily broken into individual panels. Thus, as shown the image of FIG. 8, the end of the LCD panel Pa was formed straight along a cutting line L. Since no unintended crack was formed in the resultant end faces (the broken end faces) of the manufactured LCD panel in a direction perpendicular to the end faces, the end face strength was able to be ensured. Moreover, since the LCD panel 30a was able to be manufactured by satisfactorily breaking the bonded body 30 into individual panels, the manufacturing methods of these experiments were satisfactory in terms of mass production.

In Experiments 1, 5, and 6, the crack C formed on the TFT mother substrate 10 did not develop in the substrate thickness direction, and the bonded body 30 failed to be broken into individual panels.

Figure 9:
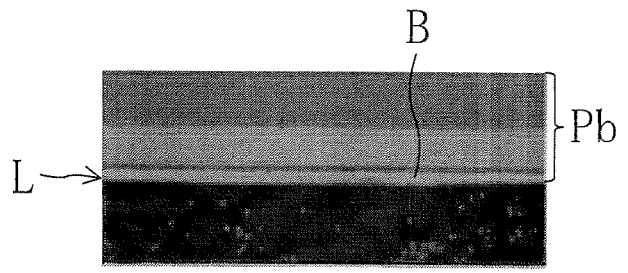
FIG. 9 is an enlarged image of an end of an LCD panel Pb.
Figure 10:
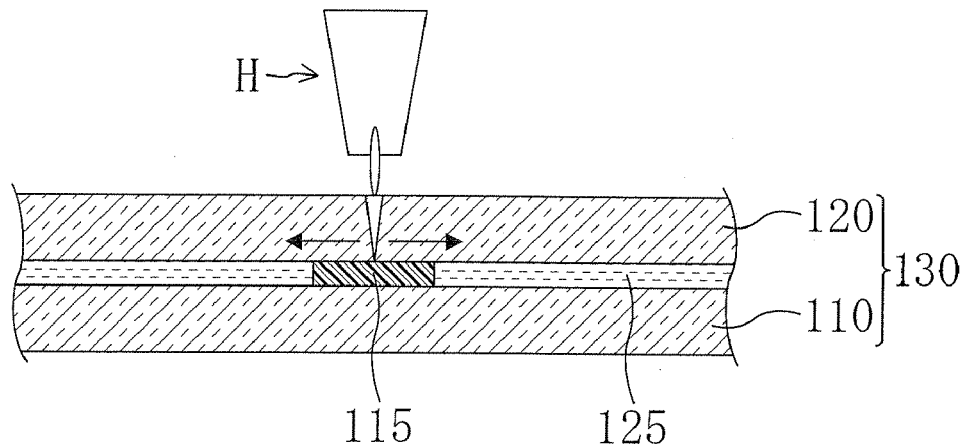
FIG. 10 is a cross-sectional view showing a process of breaking a CF mother substrate 120 of a bonded body 130 for simultaneously manufacturing a plurality of LCD panels in a conventional example.
Figure 11:
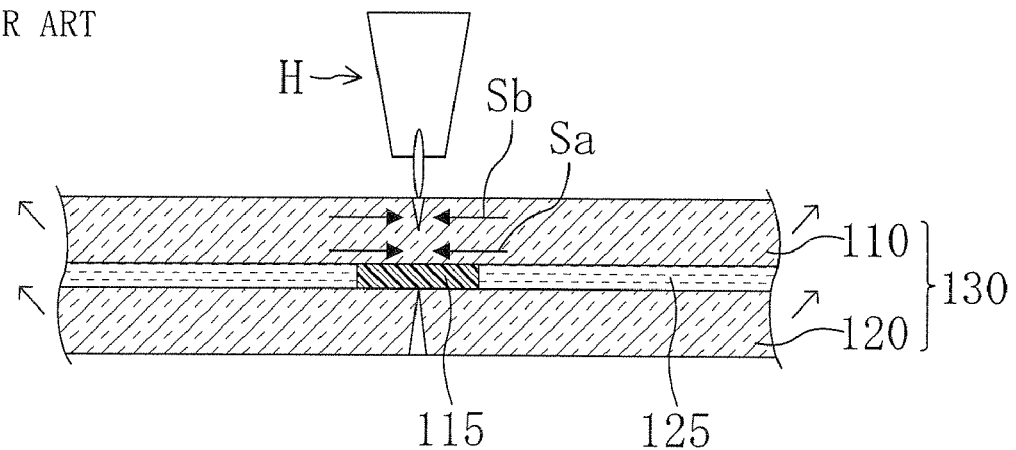
FIG. 11 is a cross-sectional view of a process of breaking a TFT mother substrate 110 of the bonded body 130 for simultaneously manufacturing a plurality of LCD panels in the conventional example.

In Experiment 2 in which the bonded body 30 was heated at 130° C. for 20 minutes after breaking the CF mother substrate 20, the bonded body 30 was able to be broken into individual panels, but as shown in the image of FIG. 9, burrs B were produced in the end of the LCD panel Pb along the cutting line L, and the appearance and the outer dimensions did not meet the product specifications.

Note that specifically, in Experiments 3 and 4, the bonded body 30 was able to be broken at a scribing pressure of 0.03-0.18 MPa and a scribing speed of 100-400 mm/sec by using, e.g., a deep penetration cutter wheel such as Penett (registered trademark) made by Mitsuboshi Diamond Industrial Co., Ltd.

As described above, according to the manufacturing method of the LCD panel 30a of the present embodiment, the residual stress reducing step of heating the bonded body 30 to the glass transition point of the sealant 15 is included between the CF mother substrate breaking step of breaking the CF mother substrate 20 of the bonded body 30, which is to be broken first, and the TFT mother substrate breaking step of breaking the TFT mother substrate 10 of the bonded body 30, which is to be broken later. This reduces the compressive residual stress that is caused by the sealant 15 in the inner surface of the TFT mother substrate 10 of the bonded body 30 in which the CF mother substrate 20 has been broken. Thus, in the TFT mother substrate breaking step, the crack C can be caused to develop in the substrate thickness direction after being formed above at least one side of the sealant 15 surrounding each display region D in the outer surface of the TFT mother substrate 10 of the bonded body 30. Accordingly, the TFT mother substrate 10 can be broken into sections including the display regions D. Since both the CF mother substrate 20 to be broken first in the bonded body 30, and the TFT mother substrate 10 to be broken later can be broken in this manner, both the TFT mother substrate 10 and the CF mother substrate 20, which are made of glass and form the LCD panel 30a, can be broken on the sealant 15. Since both the TFT mother substrate 10 and the CF mother substrate 20 can be broken on the sealant 15, the frame width of the LCD panel 30a can be reduced. Moreover, since both the TFT mother substrate 10 and the CF mother substrate 20 can be stably broken on the sealant 15, the outer dimensional accuracy, the end face strength, and the manufacturing yield of the LCD panel 30a can be increased.

According to the manufacturing method of the LCD panel 30a of the present embodiment, the TFT mother substrate 10 and the CF mother substrate 20 have the same thickness. Thus, it is difficult to bend the bonded body 30 so that the CF mother substrate 20 faces inward, after forming the crack C in the outer surface of the TFT mother substrate 10 that is to be broken later in the bonded body 30. Accordingly, it is difficult to cause the crack C on the TFT mother substrate 10 to develop in the substrate thickness direction. However, heating the bonded body 30 in the residual stress reducing step reduces the compressive residual stress that is caused by the sealant 15 in the inner surface of the TFT mother substrate 10 of the bonded body 30. Thus, the crack C on the TFT mother substrate 10 can be caused to develop in the substrate thickness direction.

According to the manufacturing method of the LCD panel 30a of the present embodiment, the heated bonded body 30 is cooled before forming the crack C in the outer surface of the TFT mother substrate 10 of the bonded body 30. This can facilitate the process of forming the crack C in the outer surface of the TFT mother substrate 10 of the bonded body 30, and causing the crack C to develop in the substrate thickness direction.

According to the manufacturing method of the LCD panel 30a of the present embodiment, since the sealant 15 is shared by adjoining ones of the display regions D of the bonded body 30, the dead space in the bonded body 30 is reduced, and the number of LCD panels 30a that can be manufactured from the bonded body 30 can be increased.

According to the manufacturing method of the LCD panel 30a of the present embodiment, since the bonded body 30 is heated in the oven A, the bonded body 30 can be reliably heated to the glass transition point of the sealant 15.

The present embodiment is described with respect to a method in which the CF mother substrate 20 as a first mother substrate is first broken, and then the bonded body 30 is heated, and the TFT mother substrate 10 as a second mother substrate is broken. However, in the present invention, it is also possible to first break the TFT mother substrate (10) as the first mother substrate, and then to heat the bonded body (30) and break the CF mother substrate (20) as the second mother substrate.

The present embodiment is described with respect to an example in which the thickness of the TFT substrate 10a (the TFT mother substrate 10) is substantially the same as that of the CF substrate 20a (the CF mother substrate 20). However, in the present invention, the mother substrate that is to be broken later can be stably broken even if the thickness of the TFT substrate (10a) is asymmetrical with that of the CF substrate (20a). Thus, the outer dimensional accuracy, the end face strength, and the manufacturing yield of the LCD panel can be increased.

The present embodiment is described with respect to a method in which after breaking the CF mother substrate 20, the bonded body 30 is heated in the oven A to the glass transition point of the sealant 15 to reduce the residual stress of the sealant 15 in the bonded body 30, and then the TFT mother substrate 10 of the bonded body 30 is broken. However, it is also possible to use a method in which after breaking the CF mother substrate 20, the bonded body 30 is left for about 100 hours or more to reduce the residual stress of the sealant 15 in the bonded body 30, and then the TFT mother substrate 10 of the bonded body 30 is broken. By this method as well, both the TFT mother substrate 10 and the CF mother substrate 20, which are made of glass and form the LCD panel 30a, can be broken on the sealant 15 in a manner similar to that described above.

The present embodiment is described with respect to a method of manufacturing a plurality of LCD panels. However, the present invention is also applicable to a method of manufacturing a single LCD panel.

The present embodiment is described with respect to a method of manufacturing an LCD panel by an ODF method. However, the present invention is also applicable to a method of manufacturing an LCD panel by using a dipping injection method in which a sealant having a liquid crystal injection port is formed.

The present embodiment is described with respect to an active matrix driving LCD panel as a display panel. However, the present invention is also applicable to a passive matrix driving LCD panel, and all the display panels that are manufactured by bonding a pair of glass substrates together by a sealant.

INDUSTRIAL APPLICABILITY

As described above, according to the present invention, both of a pair of glass substrates that form a display panel can be broken on a sealant. Thus, the present invention is useful for display panels for mobile devices, for which a narrower frame is desired, such as LCD panels for mobile phones.

| DESCRIPTION OF REFERENCE CHARACTERS | |
|---|---|
| A | Oven |
| C | Crack |
| D | Display Region |
| H | Hard Metal Wheel (Cutting Blade) |
| 10 | TFT Mother Substrate (Second Mother Substrate) |
| 15, 15a | Sealant |
| 20 | CF Mother Substrate (First Mother Substrate) |
| 25 | Liquid Crystal Layer |
| 30 | Bonded Body |
| 30a | LCD Panel |

The invention claimed is:

1. A method of manufacturing a display panel, comprising:
a bonded body fabricating step of fabricating a bonded body having a first mother substrate, which is made of glass and in which a plurality of display regions are formed, a second mother substrate, which is made of glass and is positioned so as to face the first mother substrate, and in which a plurality of display regions are formed so as to overlap the display regions of the first mother substrate, and a sealant, which is provided in a frame shape between the first mother substrate and the second mother substrate so as to surround each of the display regions, and which bonds the first mother substrate to the second mother substrate; and
a cutting step of forming a crack above at least one side of the sealant surrounding each of the display regions in each of outer surfaces of the first mother substrate and the second mother substrate of the bonded body, and cutting the bonded body into sections including the display regions, wherein
the cutting step includes a first mother substrate cutting step of forming a crack above at least one side of the sealant surrounding each of the display regions in the outer surface of the first mother substrate of the bonded body, and then causing the crack to develop in a substrate thickness direction to cut the first mother substrate into sections including the display regions, a residual stress reducing step of reducing a residual stress of the sealant in the bonded body in which the first mother substrate has been cut, and a second mother substrate cutting step of forming a crack above at least one side of the sealant surrounding each of the display regions in the outer surface of the second mother substrate of the bonded body in which the residual stress of the sealant has been reduced, and then causing the crack to develop in the substrate thickness direction to cut the second mother substrate into sections including the display regions.

2. The method of claim 1, wherein in the residual stress reducing step, the bonded body in which the first mother substrate has been cut is heated to a glass transition point of the sealant.

3. The method of claim 2, wherein in the second mother substrate cutting step, the crack is formed after cooling the bonded body heated in the residual stress reducing step.

4. The method of claim 2, wherein in the residual stress reducing step, the bonded body in which the first mother substrate has been cut is heated in an oven.

5. The method of claim 1, wherein the first mother substrate and the second mother substrate have the same thickness.

6. The method of claim 1, wherein in the bonded body fabricating step, a liquid crystal layer is enclosed in an area located inside the sealant surrounding each of the display regions.

7. The method of claim 1, wherein in the bonded body fabricating step, the sealant is provided so as to be shared by adjoining ones of the display regions.

8. The method of claim 1, wherein in the cutting step, the bonded body is cut by using a disc-shaped cutting blade.

9. The method of claim 1, wherein in the residual stress reducing step, the bonded body in which the first mother substrate has been cut is left until the residual stress of the sealant is reduced.

* * * * *